United States Patent [19]

Biagini

[11] 4,312,191
[45] Jan. 26, 1982

[54] ENVIRONMENTAL CONTROL SYSTEM FOR AIRCRAFT WITH IMPROVED EFFICIENCY

[75] Inventor: Guido Biagini, Cherry Valley, Ill.

[73] Assignee: Sundstrand Corporation, Rockford, Ill.

[21] Appl. No.: 122,148

[22] Filed: Feb. 15, 1980

[51] Int. Cl.³ .............................................. F25D 9/00
[52] U.S. Cl. ........................................ 62/402; 62/172
[58] Field of Search ..................... 62/86, 172, 401, 402

[56] References Cited

U.S. PATENT DOCUMENTS

| | | | |
|---|---|---|---|
| 2,721,456 | 10/1955 | Whitney, Jr. et al. | 62/402 |
| 2,767,561 | 10/1956 | Seeger | 62/87 |
| 3,404,538 | 10/1968 | Kinsell | 62/172 |
| 3,428,242 | 2/1969 | Rannenberg | 62/87 |
| 3,523,428 | 8/1970 | Nagyszalanczy | 62/402 |
| 3,877,246 | 4/1975 | Schultze | 62/86 |

*Primary Examiner*—Ronald C. Capossela
*Attorney, Agent, or Firm*—Ted E. Killingsworth; Michael B. McMurry; Harold A. Williamson

[57] ABSTRACT

This invention relates to an airconditioning system to provide environmental control for an aircraft's cabin or cockpit. The system cooling cycle includes in combination: a rotary power supply and a turbomachine which includes a power compressor secured to a power shaft for providing compressed air. The rotary power supply is drivingly coupled to the power shaft to operate at a given speed. An expansion cooling turbine is mounted on a shaft concentric to the power shaft. A power driven fan is provided for directing a source of ambient air to and through a heat exchanger. The power compressor is coupled respectively to the cabin and through the heat exchanger to an input of the expansion cooling turbine to thereby draw air from the cabin and deliver the compressed air to the expansion cooling turbine. The expansion cooling turbine is designed to operate at a different speed than the given speed of the power shaft. In the final portion of the system, the expansion cooling turbine has an output coupled to the cabin to deliver conditioned air, which has been cooled, to the cabin. The system heating cycle relies on heated bleed air mixed with cooled air from the expansion turbine to heat the cabin.

34 Claims, 10 Drawing Figures

ENVIRONMENTAL CONTROL SYSTEM FOR AIRCRAFT WITH IMPROVED EFFICIENCY

TECHNICAL FIELD

This invention relates to an aircycle environmental control system for an aircraft enclosure.

BACKGROUND ART

Over the years in aircraft airconditioning installations, the designers of such systems have routinely relied upon, as a power source for the airconditioning units, compressed air bled from the aircraft's propulsion system. This bleed air, as it is termed, provided a convenient source of pneumatic power to drive the airconditioning compressors as well as other components within the airconditioning system.

It has been long recognized that this approach to powering the airconditioning unit was inefficient. The use of bleed air from the propulsion system compressor tends to significantly reduce fuel efficiency of the propulsion system. The skyrocketing cost of fuel has driven even those not normally obsessed with fuel economy, such as the military, to seek ways to economize while simultaneously improving aircraft performance.

One such area has involved helicopters where the drawing off of bleed air has always been recognized as deleterious to the helicopter's propulsion system total lift and rate of lift capacity.

In an aircraft environment such as that which involves a helicopter, the incorporation of the invention to be described hereinafter, results in dramatic improvements in total lift capacity, rate of lift and fuel efficiency.

A review of the prior art reveals that those expansion air cooling airconditioning systems that employ a turbomachine as part of the system, typically mount all of the turbomachine's impellers on a single shaft to rotate at the same speed. In this arrangement, fans, compressors and turbines that inherently operate optimally at different speeds are all driven at the same speed. With this type of arrangement, the designer of the turbomachine must attempt to design blade configuration for fans, compressors and turbines so that they will function at a speed that is not optimum for each impeller use. The presence on a single shaft of a number of different impeller units operating at a set or selected speed has given rise to vibration problems and an overall reduced efficiency of the turbomachines. This problem can be solved by employing a plurality of shafts independently mounted, which shafts carry impeller blades that can be rotated at different speeds. The principal drawback to this solution resides in the fact that the turbomachine housing for the independently mounted shafts must be larger in size and weight. Increased size and weight are an anathema to aircraft design which constantly seeks to reduce size and weight. Merely mounting impeller carrying shafts concentrically, one upon the other, with no thought as to overall efficiency does not optimize efficiency.

The Horst Schutze U.S. Pat. No. 3,877,246 is typical of the best prior art approach where expansion air cooling is provided and involves a bleed air driven airconditioning system for an aircraft. In FIG. 1, there is illustrated a multiple, independently mounted shaft arrangement, and in FIG. 2, a single shaft with four sets of impeller blades mounted thereon and finally in FIGS. 3 and 4, multiple, concentrically mounted shafts which have not been mounted in respect of each other for optimum efficiency.

Another system of expansion air cooling which involves a bootstrap aircycle system is shown in the Rannenberg U.S. Pat. No. 3,428,242. In this system, high pressure bleed air 2 is fed to a compressor 6 which in turn, passes the air through a heat exchanger 12 and then, through a turbine 18 where the air cools as it expands. The Rannenberg patent shows a fan 36, turbine 18 and a compressor 6 all mounted on a common shaft to rotate in unison at the same speed.

The invention, to be described hereinafter, overcomes the problems of vibration and inefficiency that arise in the patents referred to above; all in a manner that reduces overall turbomachine size and weight while simultaneously avoiding vibration problems and improving efficiency.

DISCLOSURE OF INVENTION

This invention relates to an airconditioning system to provide environmental control for an aircraft's cabin or cockpit. The system cooling cycle includes in combination: a rotary power supply and a turbomachine which includes a power compressor secured to a power shaft for providing compressed air. The rotary power supply is drivingly coupled to the power shaft to operate at a given speed. An expansion cooling turbine is mounted on a shaft concentric to the power shaft. A power driven fan is provided for directing a source of ambient air to and through a heat exchanger. The power compressor is coupled respectively to the cabin and through the heat exchanger to an input of the expansion cooling turbine to thereby draw air from the cabin and deliver the compressed air to the expansion cooling turbine. The expansion cooling turbine is designed to operate at a different speed than the given speed of the power shaft. In the final portion of the system, the expansion cooling turbine has an output coupled to the cabin to deliver conditioned air, which has been cooled, to the cabin. The system heating cycle relies on heated bleed air mixed with cooled air from the expansion turbine to heat the cabin.

It is therefore a primary object of this invention to provide an airconditioning system for an aircraft that utilizes a shaft driven turbomachine that does not consume any bleed air during the cooling mode of operation.

Another object of the invention is to provide an airconditioning system that recirculates cabin air and involves only minimal bleed air consumption during the heating mode of operation.

Yet another object of this invention is to provide a turbomachine for an aircraft airconditioning system in which the turbomachine may be driven by mechanical, electrical or hydraulic means.

Still yet another object of this invention is to provide a turbomachine for an aircraft airconditioning system in which the turbomachine utilizes a bootstrap cycle in which an integral compressor and expansion cooling turbine are mounted on a shaft concentric to a power shaft that carries a power compressor.

A further object of the invention is to provide a turbomachine for an airconditioning system in which a shaft carrying a bootstrap compressor and expansion cooling turbine is mounted on a power shaft and rotates in the same direction at a higher speed than the power shaft that carries a power compressor.

In the attainment of the foregoing objects, the system that encompasses the preferred embodiment of the invention includes in combination, a rotary power supply that may take the form of an electrical, mechanical or hydraulic drive unit. A turbomachine employed to provide compressed air is secured to a power shaft. The rotary power supply is drivingly connected to the power shaft and operates at a given speed. A bootstrap compressor and expansion cooling turbine are mounted on a shaft concentric to and on the power shaft. A power driven fan that derives its power from the power shaft or by an independent motor is arranged to direct a source of ambient air to and through a heat exchanger. The power compressor is coupled respectively to the aircraft cabin and the inlet of the concentrically mounted compressor to thereby draw air from the aircraft cabin and deliver the compressed air to the bootstrap compressor. The bootstrap compressor has an outlet coupled to an air inlet of the expansion turbine through the heat exchanger. The bootstrap compressor and expansion cooling turbine operate at a speed greater than the given speed of the power shaft. Finally, the expansion cooling turbine has an output coupled to the aircraft cabin to deliver conditioned air which has been cooled to the cabin.

The preferred embodiment, when operated in a heating mode, further includes in combination: a source of bleed air and control means therefore. A cabin temperature sensing device is controllingly connected to the bleed air control means through a temperature control unit. The temperature control unit can be set at any desired temperature which is sought to be maintained in the cabin. The bootstrap compressor has an output coupled to the output of the expansion cooling turbine through the bleed air control means whereby bleed air, which has a temperature greater than ambient air, will be allowed to mix with the cooled air dependent upon the cabin temperature sensed by the sensing device and the temperature set in the temperature control unit. There is also provided a conditioned air temperature sensing unit which is controllingly coupled to the temperature sensing means to thereby cause the bleed air control means to allow the additional entry of bleed air whenever the conditioned air temperature reaches a preset level.

A final component of the system takes the form of a water separator adapted to receive conditioned air and remove water entrained in the conditioned air prior to delivering the conditioned air to the cabin. The water removed from air, if it is desired, can be delivered to the heat exchanger and injected into the ambient air directed through the heat exchanger to thereby enhance the heat exchanger cooling capacity.

In another embodiment of the invention, the turbomachine concentric shaft/power shaft arrangement is characterized by there being an air bearing unit disposed between the shafts, and the shafts rotate in opposite directions.

Other objects and advantages of the present invention will be apparent upon reference to the accompanying description when taken in conjunction with the following drawing:

BEST MODE FOR CARRYING OUT INVENTION

Figure 1:
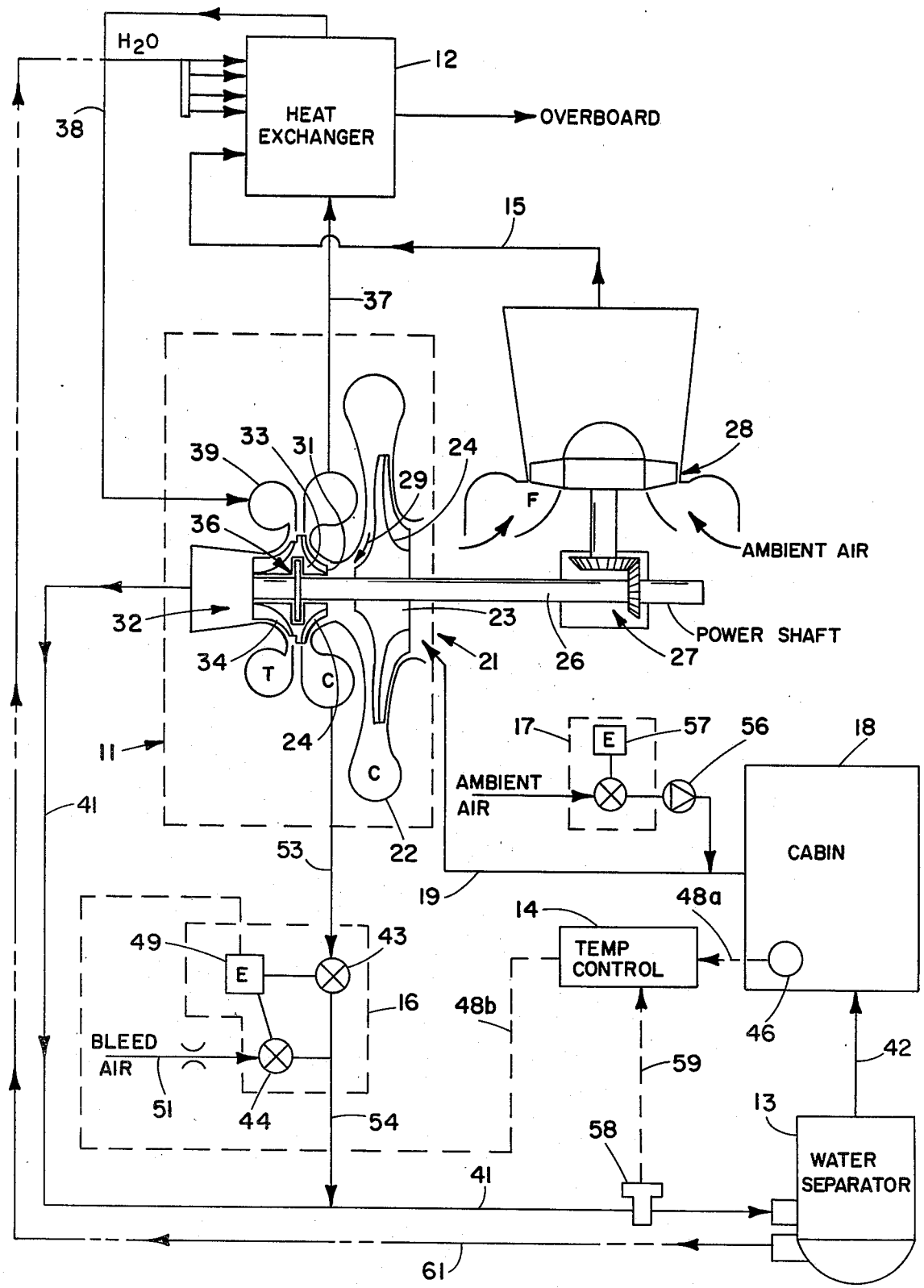
FIG. 1 in schematic form illustrates an aircycle environmental control system embodying the invention.

Reference is now made to FIG. 1 in which there is illustrated in schematic form, an aircycle environmental control system of the recirculation type. The system is designed to recirculate cabin air so engine bleed air is not consumed; thereby, conserving fuel. When the system is employed in an helicopter, for example, the employment of the system minimizes power and lift penalties. The system includes, as is schematically shown, the following basic components: a shaft driven turbomachine, shown in dotted outline, designated by reference numeral 11 and the accompanying arrow; air-to-air heat exchanger 12; a water separator 13; a temperature control unit 14; an electric motor-operated, dual modulating bleed valve 16 shown in dotted outline; an electric, motor-operated, ambient air control valve 17 shown in dotted outline; and finally, a cabin 18, the environment of which is to be controlled.

FIG. 1 depicts a number of flow paths which indicate the manner in which cabin air is recirculated through the system. Ambient air is indicated as surrounding the system, and bleed air is delivered from a compressor driven by the aircraft's engine (not shown).

The operation of the system is as follows with a starting point taken within the cabin 18. Air within the cabin 18 is drawn as is shown along flow path 19 to an inlet 21 of a power compressor 22, which is housed within the turbomachine 11. The power compressor 22 includes a compressor disk 23 carrying compressor vanes 24. The compressor disk 23 is secured to a power shaft 26. The power shaft 26 is shown extending to the right from compressor disk 23 and passing through a gear train arrangement 27. A fan 28 is driven by the power shaft 26 through gearing as shown. Accordingly, the power compressor disk 23 and fan are simultaneously driven by the power shaft 26. Fan 28 delivers ambient air along flow path 15 through the heat exchanger 12 and thence, overboard as is shown. The air-to-air heat exchanger 12 may be selected from any of a number of commercially available air-to-air heat exchangers.

Returning now to a review of the flow of recirculated air from the cabin 18, the recirculated air, once compressed by power compressor 22, is delivered as is shown by arrow 29 to an inlet 31 of a bootstrap compressor and expansion cooling turbine designated by arrow 32. The operation of bootstrap compressor/expansion turbines is well known. The operation of such a bootstrap compressor/expansion turbine is set forth in the Rannenberg U.S. Pat. No. 3,428,242, noted above. The bootstrap compressor/expansion cooling turbine 32, in this embodiment of the invention, is shown concentrically mounted for rotation on power shaft 26. The bootstrap compressor/expansion turbine 32 includes compressor disk 33 integrally secured to turbine disk 34. The compressor disk 33 with vanes 24 and integrally secured turbine disk 34 are mounted on a shaft not clearly visible on this schematic showing. The mounting arrangement is illustrated in greater detail in FIG. 2. A hydrodynamic airbearing, generally indicated by the arrow 36, is provided to allow the bootstrap compressor/expansion cooling turbine 32 to spin free on power shaft 26. Though not shown in these drawings, guide vanes are provided at the outlet of the power compressor 22 and the inlet of the bootstrap compressor/expansion turbine 32 such that, the rotational direction of the compressor disk 33 and integral turbine disk 34 are opposite to the direction of rotation of power shaft 26. The presence of counter-rotating shafts in the hydrodynamic airbearing 36 greatly enhances the friction-free operation of this bearing arrangement.

The bootstrap compressor disk 33 with vanes 24 delivers compressed air along flow path 37 to the heat exchanger 12, where the ambient air delivered through the heat exchanger 12 by the fan 28 causes the reduction of the temperature of the compressed air and allows this partially cooled compressed air to pass along flow path 38 to an expansion turbine inlet 39 of the bootstrap compressor/expansion cooling turbine 32. The compressed air so delivered passes through the expansion turbine where the pneumatic energy of the air, through expansion, is transformed into mechanical energy which drives the bootstrap compressor disk 33. The air leaving the expansion cooling turbine disk 34 is delivered along flow path 41 to the water separator 13. The water separator 13 removes a large portion of the liquid phase of water entrained in the cooled or conditioned air. The water separator 13 may be selected from any of a number of commercially available water separators designed to perform the heretofore noted function. Conditioned air with the moisture removed is delivered to the cabin 18 as is shown via flow path 42.

The description just completed assumes that a pure cooling cycle is being described. In actuality, except in very hot weather, some heated air will be mixed with the cooled air in order that the environment of the cabin be maintained at comfort levels set by the occupants of the cabin or dictated by the cooling requirements of equipment within the cabin.

The system illustrated provides two means to modify the temperature of the air undergoing recirculation. In the cooling cycle described at the outset, the electric, motor-operated, dual modulating bleed valve 16 with its valve elements 43 and 44 are in a closed position. This closed position allows no bleed air to enter and mix with the air to be recirculated. As was noted earlier, a temperature control unit 14 is provided. The temperature control unit 14 is coupled by lead 48a (shown in broken line) to a temperature setting device 46 mounted within the cabin 18. The temperature control unit 14 may be set, as is done in any conventional thermostat, at a given temperature. The temperature control unit 14 is shown electrically connected by a lead 48b to an electric motor 49 of the electric, motor-operated, dual modulating bleed valve 16. The bleed air delivered, as is shown by arrow 51, has its entry into the circulation path of the air controlled by valve element 44. It can be seen that air under pressure derived from the bootstrap compressor may be delivered along flow path 53 to valve element 43 where, dependent upon a signal received by the electric motor 49 from the temperature control unit 14, the valve element 43 will open, allowing the diversion of a portion of the compressed air prior to the expansion phase of the cycle, thereby reducing the volume of the cooled air delivered along flow path 41. In the event more heat is desired in the cabin, valve element 44 would open upon command of an electric signal from temperature control unit 14, and bleed air would also enter the flow path 54 and mix with the air from flow path 41. The bleed air, so mixed, is drawn to and through the water separator 13 and along flow path 42 to the cabin 18.

There are occasions when the occupants of the cabin may desire fresh air introduced into the recirculating air, in order that oxygen levels that have been reduced by the metabolic consumption of the cabin occupants be restored. In this type of situation, the electric, motor-operated, ambient air control valve 17 may be caused to be opened, thereby allowing ambient air to be drawn passed a check valve 56 into the flow path 19. The invention contemplates, though not shown, that the electric motor 57 of the electric, motor-operated, ambient air control valve 17 may be manually or automatically controlled to provide fresh air.

There are times when the temperature of the conditioned air present in flow path 41 drops to a temperature level that would allow water entrained in the air to freeze, thereby causing the water separator 13 to clog and preclude the passage of conditioned air via flow path 42 to the cabin 18. To prevent this freezing of water, a temperature sensing device 58 is shown schematically intersecting the flow path 41. The temperature sensing device 58 may be selected such that when a temperature lower than 35° F. is detected in the conditioned air in flow path 41, the temperature control unit 14 receives a signal via lead 59, shown in broken lines, which results in a signal being delivered over lead 48b to the electric motor 49 of the electric, motor-operated, dual modulating bleed valve 16. The valve 43 is opened, and compressed air from flow path 53 is allowed entry into flow path 54 which thereafter mixes with the cooled air in flow path 41. The compressed air, which is warmer than the cooled air, raises the temperature of the air delivered to the water separator 13, thereby precluding the freeze-up and clogging of the water separator. If the compressed air from path 53 cannot raise the mixed temperature of the airflow of path 41 to 35° F., then, in sequence, valve 44 will open and admit bleed air into path 54.

This system includes an additional feature which further enhances the efficiency of its operation. The water that has been removed in the water separator 13 is collected and then delivered, as is shown along broken flow line path 61, to the heat exchanger 12 where the water is injected in the form of a spray, by a means not shown, into the ambient air being directed through the heat exchanger 12 by the fan 28. The presence of the water spray enhances the cooling efficiency of the heat exchanger 12 in a known manner.

Figure 2:
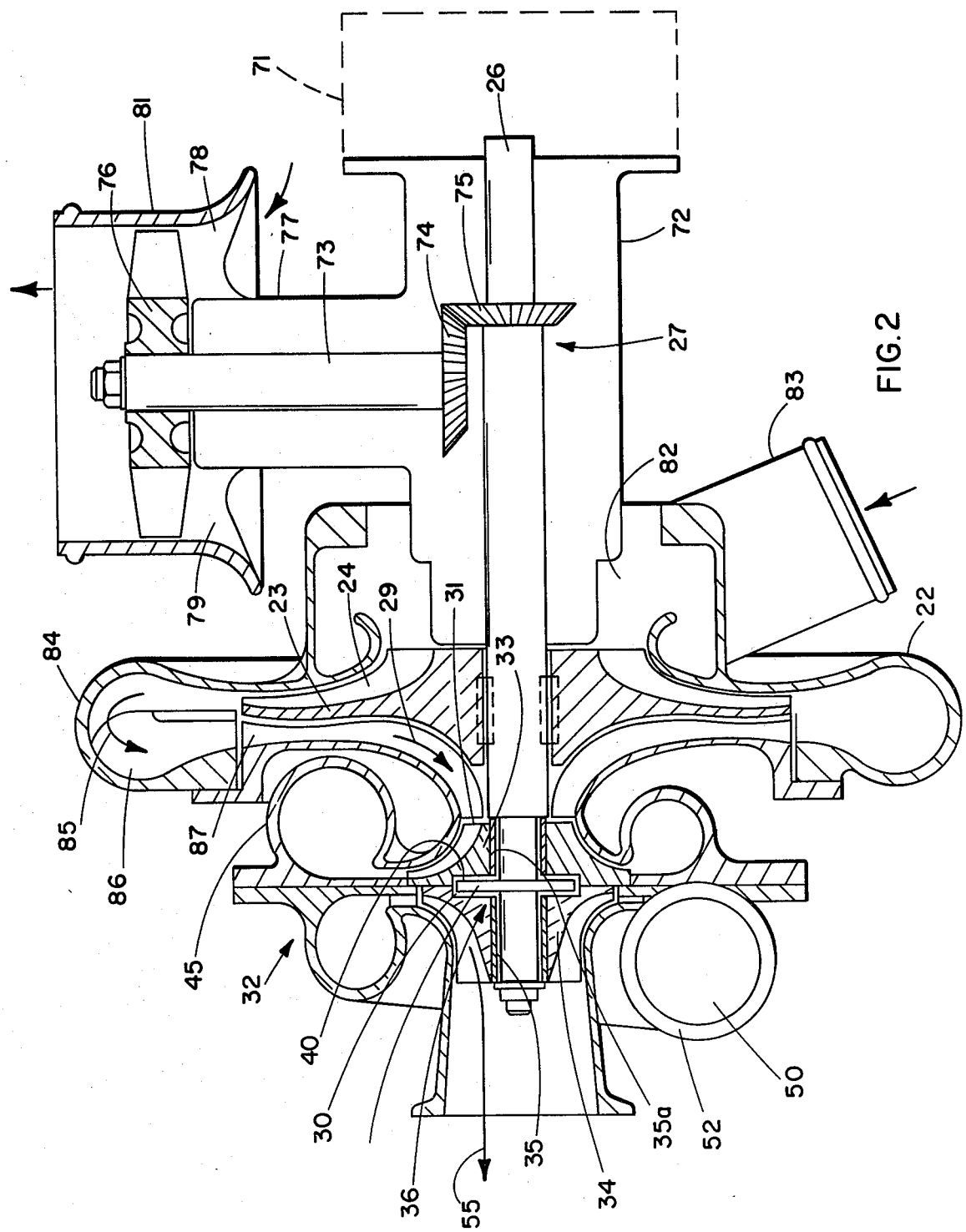
FIG. 2 depicts, in partial section, a turbomachine suited for use in the system of FIG. 1.

Reference is now made to FIG. 2, which illustrates in partial cross-section, a turbomachine utilized in the practice of the invention as shown in FIG. 1. The description of the turbomachine will commence at its right-hand side as viewed in FIG. 2 and proceed towards the left. Accordingly, there is shown a gear box and transmission 71, shown in dotted outline, which gear box and transmission 71 receives power from the propulsion engines of the aircraft, not shown. The gear box and transmission 71 is shown absent any details as the gear box and transmission merely represent a mechanical drive that might be utilized in providing power to power shaft 26. A gear train arrangement 27 is mounted within a gear train housing 72. Details of the bearing structure on which the power shaft 26 and gear train 27 are mounted are not shown. Suffice it to say that conventional bearing structures are provided to support power shaft 26 as well as fan shaft 73. A gear 74 secured to fan shaft 73 is shown in mating engagement with a gear 75 secured to drive shaft 26. The fan shaft 73 has secured thereto a radial vane axial flow fan 76. A fan shaft support housing 77 has secured thereto, by web-shaped elements 78, 79 an outer fan housing 81.

It should be noted that power drive shaft 26 extends through the gear train housing 72, a cabin air inlet housing 82 and through bootstrap compressor/expansion cooling turbine 32. The cabin air inlet housing 82 includes a cylindrically-shaped inlet 83 integrally formed with the housing 82. A compressor disk 23 is shown secured to the power shaft 26 by keys not referenced. The compressor disk 23 has radially disposed vanes 24. The disk 23 and vanes 24, when rotated, cause air from the cabin to be delivered through the cylindrically-shaped inlet 83 into cabin air inlet housing 82 and thence, to and between the compressor vanes 24 where the air is compressed and delivered initially to a volute 84 where the direction of flow is changed as is evidenced by arrow 85. The compressed air is directed by fixed guide vanes 86 through passage 87 to the inlet 31 of the bootstrap compressor/expansion turbine 32, as evidenced by arrow 29. The bootstrap compressor/expansion turbine 32 includes a compressor disk 33 integrally secured to turbine disk 34. The compressor disk 33 and turbine disk 34 are secured to a two-part concentric shaft 35, 35a, constituting the radial element of an hydrodynamic airbearing 36. A recessed opening 30 in compressor disk 33/turbine disk 34 and radially disposed thrust plate 40 constitute the thrust element of the hydrodynamic airbearing.

Compressed air, as is shown by arrow 29, enters bootstrap compressor at its compressor inlet 31 where it is thereafter delivered to volute 45 whereafter it is delivered to the heat exchanger 12 by a conduit not shown. The compressed air, just referenced, is returned from the heat exchanger 12 to the inlet 50 of volute 52 whereafter, the compressed air passes by the expansion turbine disk 34 as is shown by air flow arrow 55.

The power shaft 26 of the turbomachine 11 is typically driven at low rotational speeds; for example, 10,000–23,000 R.P.M. These relatively low rotational speeds produce distinct advantages in enhancing the life characteristics of the rotative component elements, such as bearings, gears, seals etc. The most efficient speed for the bootstrap compressor and expansion turbine is in excess of 65,000 R.P.M. It will be appreciated that should the bootstrap compressor/expansion turbine and its compressor and turbine disk be secured to the power shaft, as is common in the prior art, there would be a mismatch because of the high specific speed and efficiency characteristics of the bootstrap compressor/expansion turbine. The mismatch, just noted, would arise because of the fact that all three of the impellers of the turbomachine were forced to rotate at the same low speed.

This mismatch and the consequent low thermodynamic impeller efficiency is avoided by use of the high-speed impellers; namely, compressor disk 33 and turbine disk 34 mounted on two-part concentric shaft 35, 35a which is coaxial with the low-speed power shaft 26, which power shaft 26 carries the power compressor disk 23.

In this embodiment, the power shaft 26 rotates in one direction while the concentric two-part power shaft 35, 35a rotates in an opposite direction. This counter-rotation enhances the efficiency of hydrodynamic airbearing 36.

Figures 3, 3A:
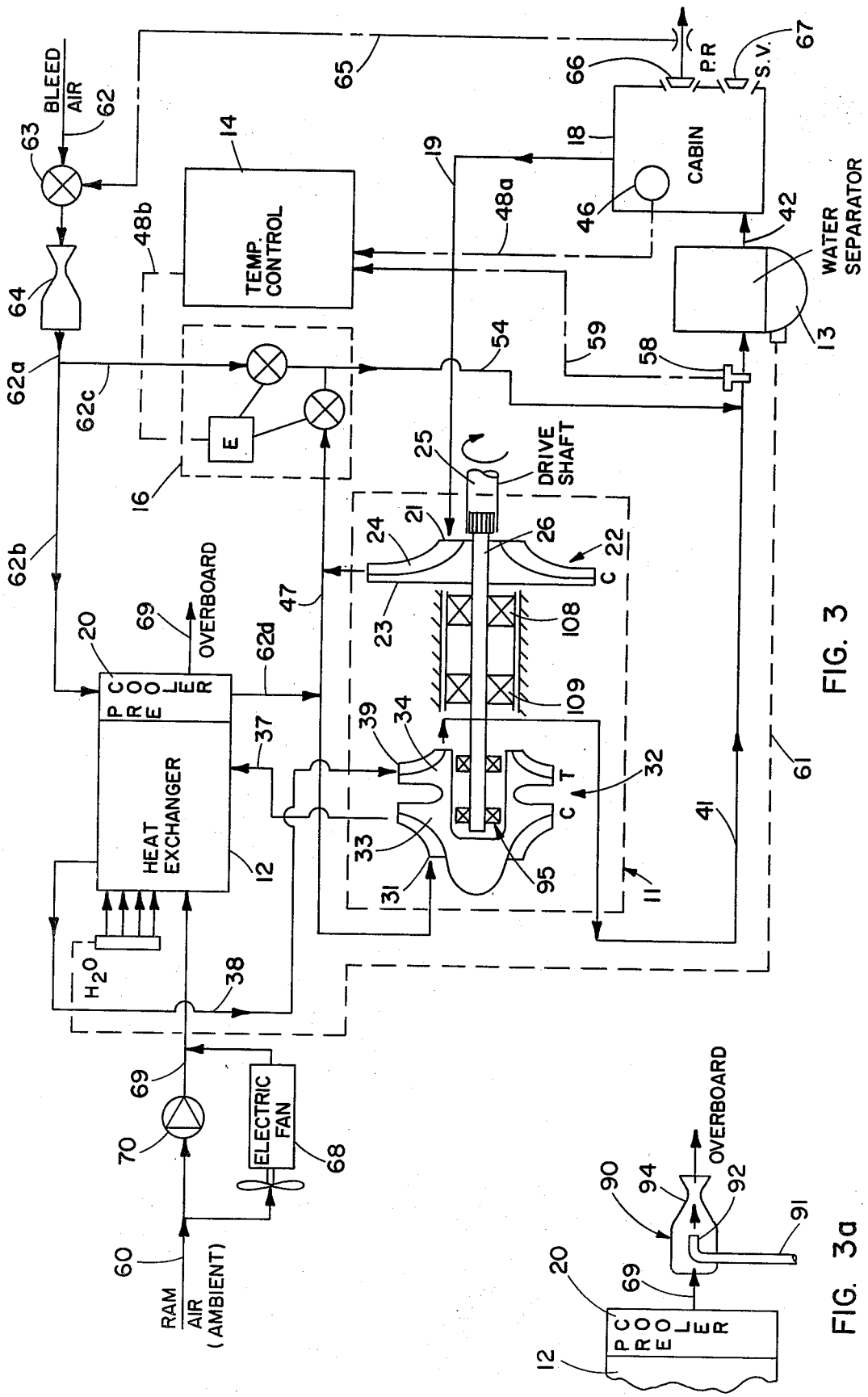
FIG. 3, in schematic form, illustrates a variation of the aircycle environmental control system that embodies the invention.
FIG. 3a illustrates a ram air ejector suitable for use in the system of FIG. 3.

Reference is now made to FIG. 3 in which there is illustrated a variation of the aircycle recirculation system illustrated in FIG. 1. The aircycle recirculation system of FIG. 3 differs principally from the system of FIG. 1 in that the FIG. 3 system is set in a aircraft environment which requires that the cabin by pressurized. In FIG. 1, the system was designed to handle a typical helicopter environment in which the cabin of the helicopter did not require pressurization. Accordingly, the airconditioning recirculation system of FIG. 3 finds utility in those aircraft which fly at altitudes that require the cabin be pressurized.

The turbomachine 11 of FIG. 3 differs from the turbomachine 11 of FIG. 1 in that, while FIG. 1 illustrates a bootstrap compressor/expansion cooling turbine 32 that is provided with hydrodynamic airbearings 36, the turbomachine 11 of FIG. 3 includes a conventional ballbearing support 95 for the bootstrap compressor/expansion cooling turbine 32. The details of the ballbearing support 95 are set forth and explained in full in respect of the turbomachine 11 shown in FIG. 4. It is to be understood that as the explanation of the operation of FIG. 3 unfolds, wherever components of the system in FIG. 3 find their equivalent components with the same function as that shown in FIG. 1; the same reference numerals applied in FIG. 1 will be applied to those similar components in FIG. 3. The operation of this system is as follows with a starting point taken within the cabin 18. Air within the cabin 18 is drawn, as is shown, along flow path 19 to an inlet 21 of power compressor 22 which is housed within the turbomachine 11. The power compressor 22 includes a compressor disk 23 carrying compressor vanes 24. The compressor disk 23 is secured to a power shaft 26. The power shaft 26 is driven in the same manner as was explained with reference to the power shaft 26 illustrated and described with respect to FIG. 1. It will be noted that in this embodiment of the invention, there is no fan connected to be driven simultaneously with the power shaft 26. It will be recalled that the fan 28 of FIG. 1 was employed to cause the movement of ambient air through a heat exchanger 12. In FIG. 3, the movement of ambient air through the heat exchanger 12 is accomplished by the inclusion of an independently driven electric fan 68 which draws ambient ram air, as shown by flow path 60, to and past the fan 68 along the flow path 69 whereupon, the ambient air passes to and through the heat exchanger 12 whereafter, it is dumped overboard. A check valve 70 is shown in the flow paths 60, 69. When the aircraft is in motion, the volume of ram air produced by the relative motion of the aircraft with respect to the ambient air is sufficient to provide adequate cooling of the heat exchanger 12. When the aircraft is on the ground, the electric fan 68 will be activated to provide a sufficient flow of ambient air through heat exchanger 12 to allow the aircycle, airconditioning, recirculation system shown in FIG. 3 to operate efficiently.

Returning now to a review of the flow of recirculated air from the cabin 18, the recirculated air once compressed by power compressor 22 is delivered, as is shown by flow arrow 47, to an inlet 31 of bootstrap compressor/expansion cooling turbine 32. The bootstrap compressor/expansion cooling turbine 32 functions in the same manner as that described with respect to the same component in FIG. 1. The bootstrap compressor/expansion cooling turbine 32 is shown concentrically mounted for rotation by ballbearing supports 95 on power shaft 26. The power shaft 26 is supportingly mounted by ballbearing arrangement 108, 109 at a point between the power compressor 22 and the bootstrap compressor/expansion cooling turbine 32 as is shown. The bootstrap compressor/expansion cooling turbine 32 includes compressor disk 33 and turbine disk 34 which are mounted on a shaft not clearly visible on this schematic showing, but clearly evident as shaft 112 in the illustration of FIG. 4. Attention is now directed to a bleed air source, not shown, which has bleed air under pressure delivered as is shown by flow arrow 62 to a valve 63. Passage of the bleed air through the valve 63 is controlled by a cabin pressure regulator 66 which is linked to valve 63 by the electric pneumatic control connection 65. It should be understood that the cabin 18 is not airtight and that leakage will occur from the cabin to the ambient atmosphere surrounding the aircraft as the elevation of the aircraft increases and the pressure within the cabin exceeds that of the ambient environment. As air escapes from the cabin and the pressure drop is detected by cabin pressure regulator 66, a control signal is delivered over the control connection 65 to the valve 63, which valve allows bleed air under pressure to pass through the valve 63. Bleed air under pressure passes through a venturi 64 as is shown by flow arrow 62a and thence onto a precooler 20 of heat exchanger 12 as shown by flow arrow 62b. It will be recalled that bleed air is generally of a temperature greater than the ambient and therefore, prior to its delivery into the air recirculation system being described, its temperature should be lowered in order to reduce the cooling effort necessary in the bootstrap compressor/expansion cooling turbine 32. Bleed air, shown by flow arrow 62d, delivered through the precooler 20 of heat exchanger 12 meets and mixes with recirculated air delivered from the power compressor 22 along flow path 47. This mixed bleed air and recirculated air is then delivered to the inlet 31 of the compressor portion of the bootstrap compressor/expansion cooling turbine 32. From this point on, the system operates much in the same fashion as that described with respect to FIG. 1, in that the recirculated air passes through the power compressor 22 and thence along flow path 37 through heat exchanger 12 where it is cooled and thence, along flow path 38 to expansion cooling turbine inlet 39. The air so delivered passes by turbine disk 34, is expanded and cooled and thereafter, is delivered to a water separator 13 along flow path 41. The recirculated air with water removed by the water separator is delivered along flow path 42 to the cabin 18. The cabin 18 includes a safety pressure relief valve 67. The safety pressure relief valve 67 opens if a malfunction should occur in the cabin pressure regulator 66 and/or valve 63 and there is allowed a greater level of pressure in the system than is safe for the occupants of the cabin.

The heat mode of operation and ice prevention of the conditioned air for the system of FIG. 3 is the same as that described with respect to FIG. 1. A temperature control unit 14 is connected by lead 48a to a temperature setting device 46. The temperature control unit 14, in turn, has an output which appears on lead 48b to an electric, motor-operated, dual modulating bleed valve 16 which dual modulated bleed valve operates in the same fashion as described in respect to FIG. 1. A temperature sensing device 58 is electrically connected by lead 59 to the temperature control unit 14 and likewise operates as was described with respect to FIG. 1.

Reference is now made to FIG. 3a which illustrates in schematic form what is termed as a ram air ejector 90. The ram ejector 90 is intended to take the place of the electric fan 68 of FIG. 3. The ram air ejector 90 is comprised of a generally horn-shaped element 94 which has disposed, therein, a conduit 91 which terminates in a nozzle 92 as is shown. The conduit 91, in the alternative, may be connected to and receive recirculated air under pressure from flow path 47 or flow path 37. Recirculated air under pressure, passing to and through the nozzle 92, results in ambient air being drawn through the heat exchanger 12 with precooler 20 whereafter, ambient air so drawn, as shown by flow path 69, passes through the ram air ejector 90 and is dumped overboard. It is recognized that this manner of providing a flow of air through the heat exchanger 12 will reduce the aircycle efficiency. The presence of the ram air ejector 90 will preclude the need for the electric fan 68. The ram air ejector 90 weighs much less than the electric fan 68, and the substitution of the ram air ejector 90 for the electric fan 68 will result in an overall weight reduction of the aircycle airconditioning system.

Figure 4:
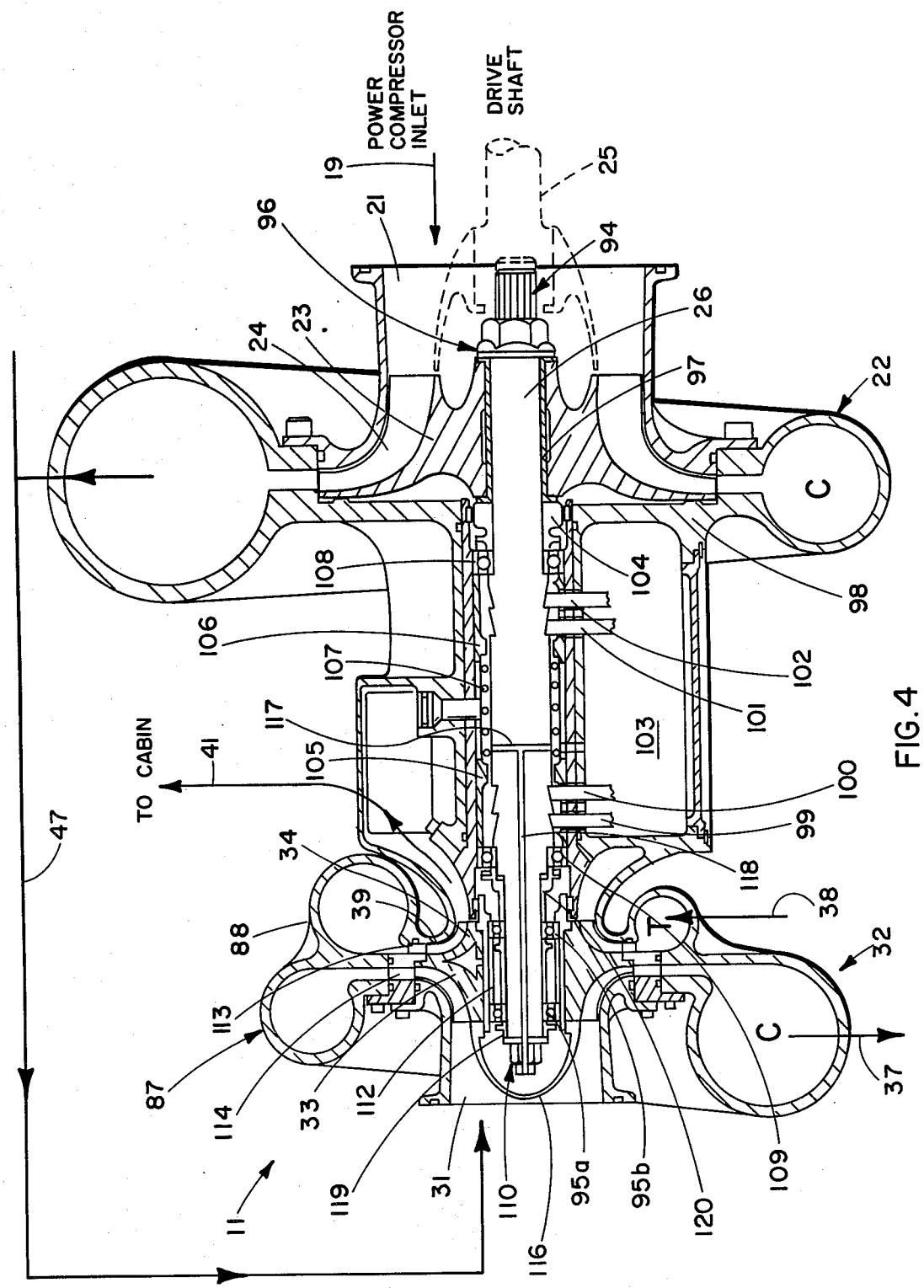
FIG. 4 depicts, in partial section, a turbomachine for use in the system of FIG. 3.

Reference is now made to FIG. 4 which illustrates in detail the turbomachine 11 shown in schematic form in FIG. 3. In the righthand portion of the turbomachine 11, there is shown the power compressor 22 which has contained therein, compressor disk 23 with its associated compressor vanes 24. The compressor disk 23 is shown secured to power shaft 26 by splined portion 97 of the power shaft 26. The compressor disk 23 is secured in place on the power shaft 26 by nut and washer arrangement 96. Shown in dotted outline to the right of compressor disk 23 is a drive shaft 25 which has a splined connection 94 between the drive shaft 25 and a portion of power shaft 26 which extends into drive shaft 25. Air flow arrow 19 indicates the direction of recirculated air being drawn from the cabin to the inlet 21 of the power compressor 22. The power shaft 26 is mounted in the turbomachine housing 98 on a pair of preloaded ballbearings 108, 109 as is shown. A seal 104 separates preloaded bearing 108 from compressor disk 23. The bearings 108 and 109 are preloaded by means of a centrally disposed spring 107 which abuts at either end with sleeves 105, 106. Spring 107 is in compression and transmits force to the respective bearings 108, 109 via sleeves 106, 105. Lubrication to the power shaft 26 is accomplished through a conventional wick and oil sump arrangement of a type similar to that shown in FIG. 1 of U.S. Pat. No. 2,916,890. Only portions of oil wicks 99, 100, 101, 102 are shown extending downwardly into the oil sump 103. The lefthand side of the turbomachine 11, as viewed in FIG. 4, includes the bootstrap compressor/expansion cooling turbine 32. Recirculated air that has been compressed by the power compressor 22 is delivered along flow path 47 to the bootstrap compressor inlet 31. The bootstrap compressor/expansion cooling turbine 32 includes a compressor disk 33 and turbine disk 34 which disks are integrally secured, one to the other, and are mounted on concentric shaft 112. The concentric shaft 112 is, in turn, supported upon ballbearing units 95a, 95b which are, in turn, carried by power shaft 26. From the illustration, it will be apparent that the bootstrap compressor disk 33 and expansion turbine disk 34 rotate in unison on and about power shaft 26. The bootstrap compressor includes a volute 87 that has disposed, between the volute 87 and the compressor disk 33, compressor diffuser vanes 114. The expansion cooling turbine includes a volute 88 which has disposed, between the volute 88 and the turbine inlet 39, a turbine nozzle arrangement 113. The bootstrap compressor volute 87 and the expansion cooling turbine volute 88 are integrally formed into a unitary housing. The bootstrap compressor delivers compressed air as is shown by flow arrow 37 to and through the heat exchanger 12 as shown in FIG. 3 whereafter, the partially cooled, compressed and recirculated air is delivered as is shown by flow arrow 38 to expansion turbine volute 88 whereafter, it is expanded and cooled and delivered as conditioned air as shown by flow arrow 41.

At the lefthand end of power shaft 26, there is shown a bearing shroud 116 which acts to contain oil which has lubricated bearings 109, 95b and 95a. Oil is, therefore, delivered in the region between the bearing shroud 116 and the nut and washer 110 shown secured to the lefthand end of power shaft 26. Oil delivered to the region just noted flows back through oil conduits 118 and 117 into the oil sump 103. The nut and washer arrangement 110, in conjunction with sleeve 119 and 120, secures, as is shown, the ballbearings 95a and 95b in respect of power shaft 26. Concentric shaft 112, in turn, is centered and secured to the outer portion of ballbearings 95a and 95b.

The rotational speed of ballbearings 95a, 95b is equal to the difference of the absolute speed of concentric shaft 112 and the absolute speed of power shaft 26 with respect to a mutual external ground reference. This is true because the inner races of ballbearings 95a, 95b rotate in unison with power shaft 26 and, the power shaft 26 rotates at a lower speed and in the same direction as concentric shaft 112, and the outer races of the ballbearings rotate in unison with the concentric shaft 112.

Therefore, for the same absolute rotational speed of concentric shaft 112, ballbearings 95a, 95b, when mounted on power shaft 26, rotate at a lower speed than if they were mounted, conventionally, on a fixed turbomachine base.

The lower rotational speed of the ballbearings 95a, 95b produces distinct advantages in enhancing their life characteristics, because the lower rotational speed reduces friction and wear of the bearing races. All other design parameters being equal, this arrangement permits derating of the ballbearings by allowing the use of larger and higher load-carrying bearing components.

Figure 5:
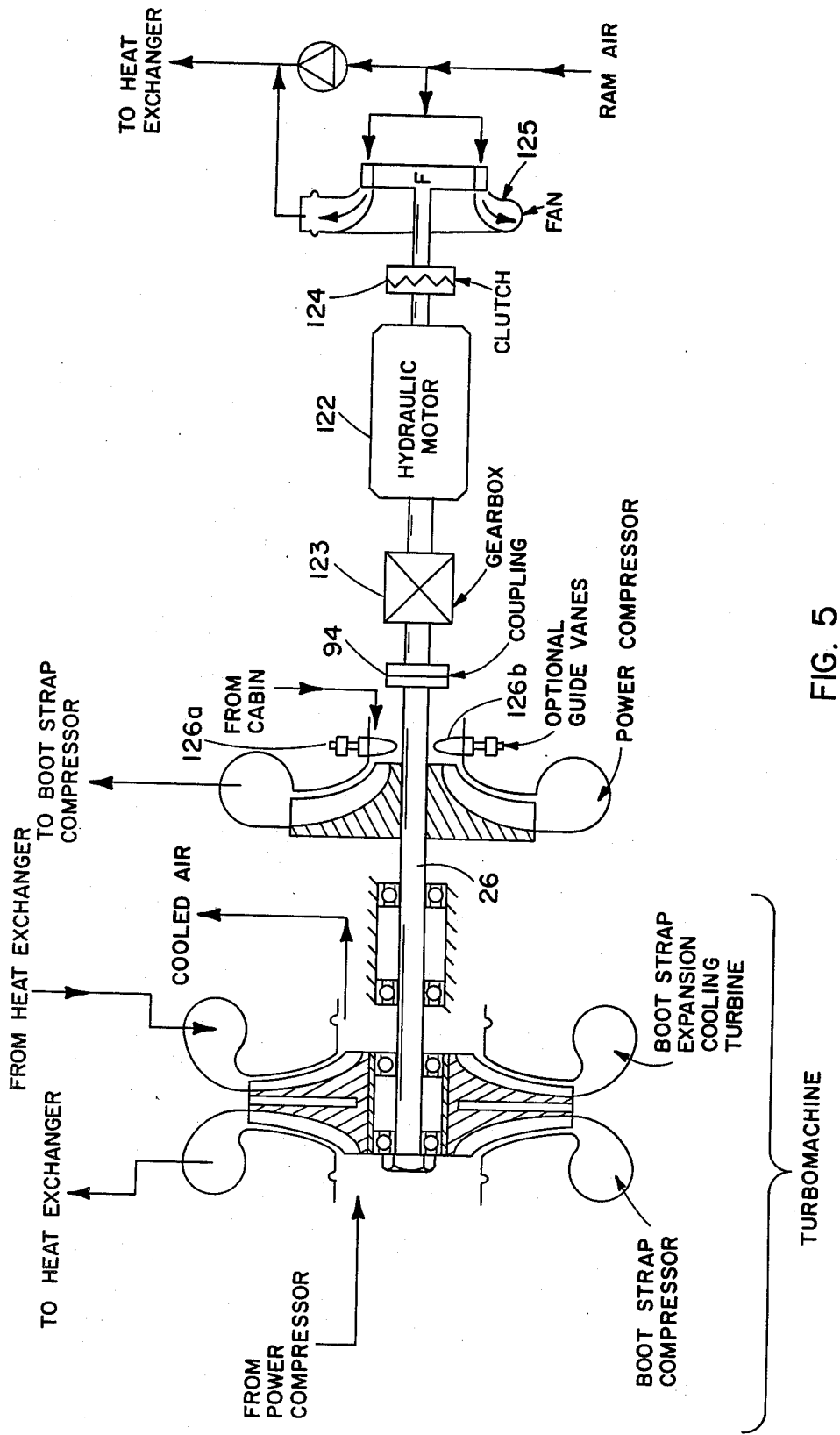
FIG. 5, in schematic form, illustrates another variation of the aircycle environmental control system that embodies the invention.

Reference is now made to FIG. 5 in which there is illustrated in schematic form a turbomachine of the type described in detail in FIG. 4. The turbomachine of FIG. 5 illustrates another variation of a system which provides a different manner of powering the power shaft 26. Accordingly, FIG. 5 shows, in block-type schematic form, a hydraulic motor drivingly connected through a gearbox 123 and a coupling 94 to power shaft 26. The hydraulic motor 122 is shown coupled through a clutch 124 to drive fan 125 which provides a flow of ambient air to a heat exchanger. Optional guide vanes 126a, 126b are shown in schematic form positioned in the inlet to the power compressor. The inlet guide vanes 126, 126b are provided to modulate the flow of recirculated air into the power compressor. Guide vanes 126a, 126b are positioned by an electric motor, not shown, which motor causes rotation of the guide vanes by means of a ring gear, not shown. The ring gear drive includes segmented gears attached to each guide vane causing the guide vanes to rotate in unison. The guide vanes 126 are normally closed and are powered to the open position by an electro-mechanical control, not shown, that responds to command signals from a cabin supply airflow transducer. The more cooling required, the wider the guide vanes 126 are open.

Figure 6:
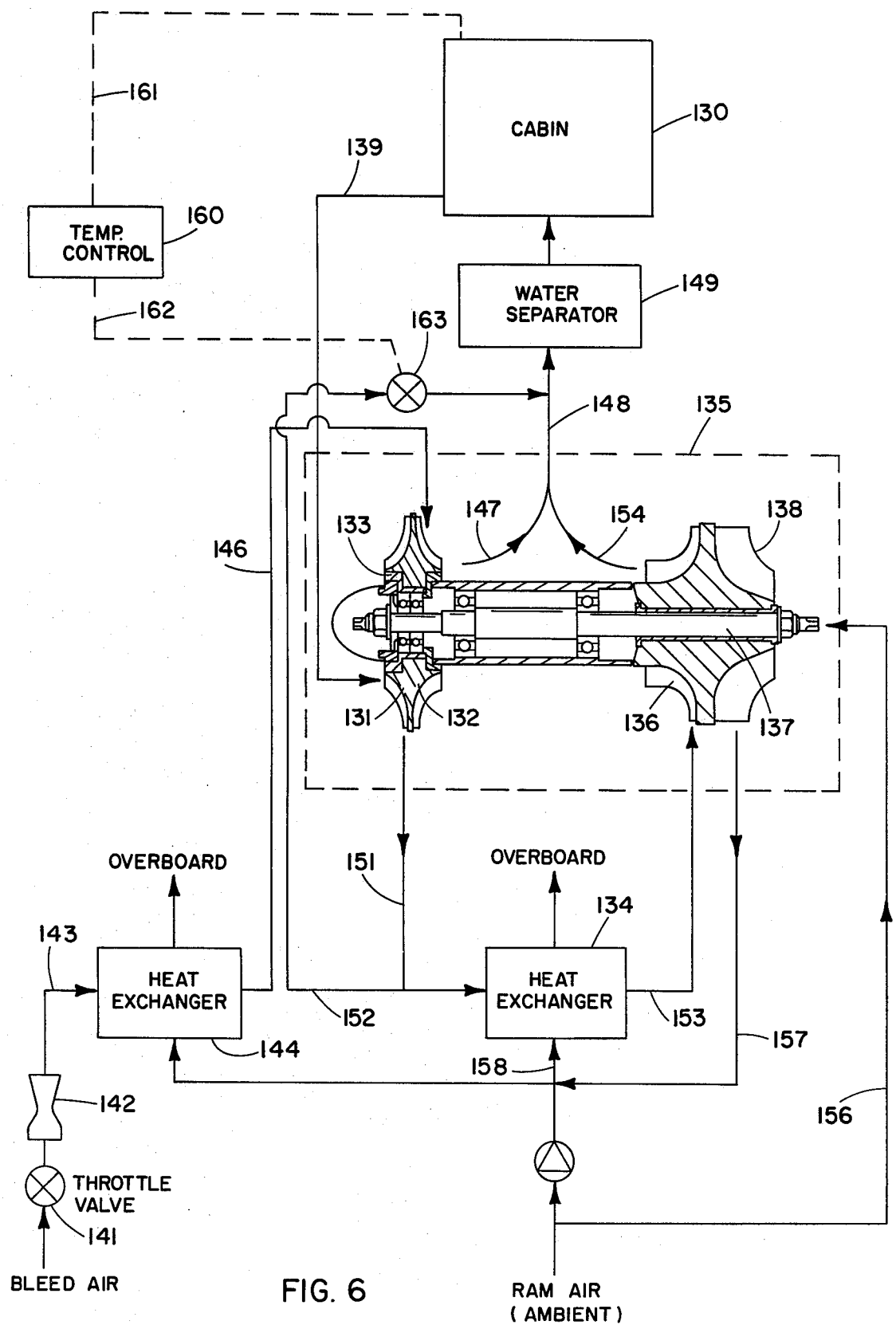
FIG. 6, in schematic form, illustrates yet another variation of the aircycle environmental control system that embodies the invention.
Figure 7:
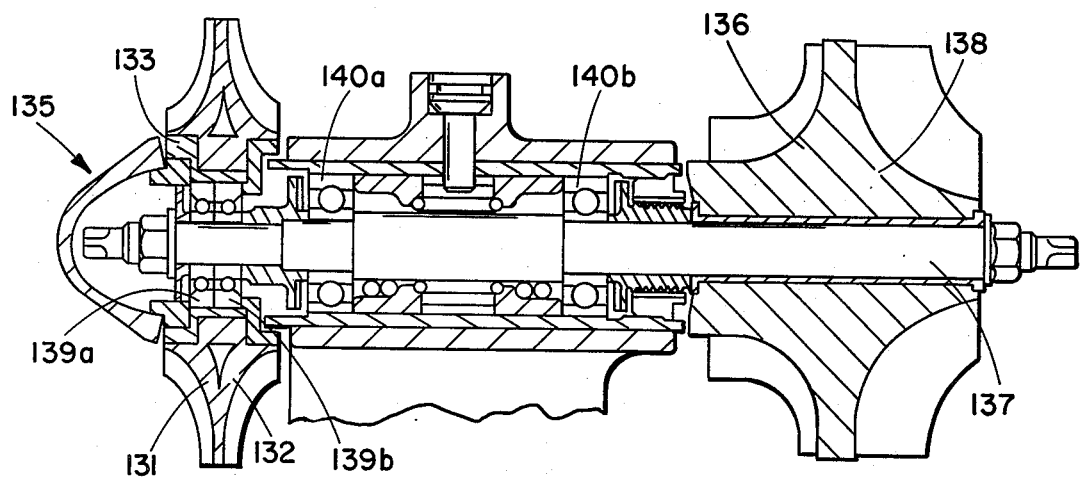
FIG. 7 depicts, in section, a turbomachine for use in the system of FIG. 6.

Reference is now made to FIG. 6 which illustrates yet another embodiment of the invention. Many of the components to be described hereinafter in regard to FIG. 6, find equivalent structure in the earlier described figures. The aircycle environmental control system depicted in FIG. 6 is of the recirculation type. The basic components of this system include a cabin 130, the environment of which should be controlled. A turbomachine 135 includes a power turbine 132 secured to a power shaft 133. Details of the manner in which the power shaft 133 is mounted will be set forth in greater detail hereinafter when FIG. 7 is described. The power turbine 132 is integrally secured to a high-speed compressor 131. Expansion cooling turbine 136, shown integrally secured to a fan 138, are mutually secured to shaft 137 which passes to the left through a bearing support, not referenced, into and through a bearing support, not referenced, in power shaft 133. The shaft 137 is mounted, as is shown, concentric with power shaft 133. An air-to-air heat exchanger 134 of the type earlier described is also included in the system. In this aircycle recirculation system, rotary power is provided by use of bleed air taken from the aircraft propulsion system. The bleed air is shown delivered through a throttle valve 141 thence, through venturi 142, along flow path 143, through air-to-air heat exchanger 144 and thence, along flow path 146 to the power turbine 132. The power turbine 132 is driven by the high-pressure stream of bleed air. The power turbine 132 provides a rotary power supply to the integrally secured high-speed compressor 131 and power turbine 132. The bleed air that passes through the power turbine 132 expands in its passage and is cooled. The cooled expanded air is then delivered as is shown by flow arrow 147, 148 to and through a water separator 149 and finally, to the cabin 130. The cooled expanded air from the power turbine 132 is mixed with cooled expanded air shown by flow arrow 154 from the expansion cooling turbine 136. As has been noted, the power turbine 132 drives the high-speed compressor 131, which compressor 131 draws air from the cabin 130 along the flow path 139 to the high-speed compressor 131, where the recirculated air is compressed and delivered as is shown over flow path 151 to and through heat exchanger 134 and thence, along flow path 153 to expansion cooling turbine 136. The air so delivered to the expansion cooling turbine 136 is expanded, cooled and delivered, as is shown by flow arrow 154, to mix with the expanded and cooled air shown by flow arrow 147 of power turbine 132. This mixed cooled air from both the power turbine 132 and expansion cooling turbine 136 is delivered, as was noted, along flow path 154 to water separator 149 and thence, this conditioned air is delivered to the cabin 130.

The compressed air delivered along flow path 153 that had its origin in the high-speed compressor 131, in passing through the expansion cooling turbine 136, causes the integrally secured fan 138 to be driven. The fan 138 draws ambient air, as is shown, along flow path 156 which ambient air passes through the fan 138 and is delivered along flow path 157, 158 to and through the heat exchanger 134 and along flow path 157, 159 to and through the heat exchanger 144. A temperature control unit 160 of the type described in the earlier figures is shown electrically connected by lead 161 to a sensing device, not shown, in the cabin 130. The temperature control 160 is also shown electrically connected by lead 162 to an electric motor-operated valve 163. The valve 163, when opened, allows air from the high-speed compressor 131 to be delivered along flow path 151, 152 to and through the valve 163 whereafter, this air is then delivered to flow path 148 to be mixed with the cooled air present in flow path 148. It will be appreciated from the foregoing systems described that there may be a number of variations in respect of temperature and pressure control that may be employed in the system. It should be understood that the system shown in FIG. 6 illustrates a single system arrangement that may be modified in the manner taught by the earlier figures to provide both temperature and pressure control for the system.

Reference is now made to FIG. 7 which illustrates in detail, the basic components of the turbomachine shown in schematic form in FIG. 6. Accordingly, there is shown a high-speed compressor 131 and power turbine 132 integrally secured to a power shaft 133. The power shaft 133 is, in turn, shown mounted on ballbearing units 139a, 139b. A shaft 137 extends through the ballbearing units 139a and 139b. The shaft 137 carries, secured thereto, expansion cooling turbine 136 and fan 138. The shaft 137 is supported near its midsection in ballbearing units 140a, 140b.

Figure 8:
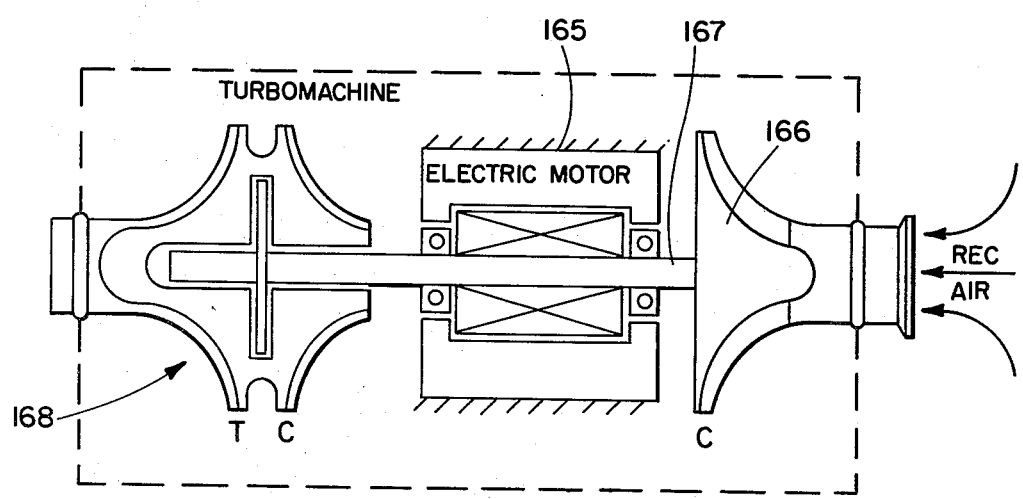
FIG. 8 illustrates, in schematic form, still yet another variation of a turbomachine and power drive that embodies the invention.

Reference is now made to FIG. 8 which shows in schematic form, another variation of a turbomachine for use in the aircycle recirculation environmental control system heretofore described. The turbomachine includes at its lefthand end, a bootstrap compressor/expansion cooling turbine 168, mounted on an airbearing not referenced. The airbearing and bootstrap compressor/expansion cooling turbine 168 is of the same design as that shown in detail in FIG. 2. A power shaft 167 carries integrally, therewith, power compressor 166. The power shaft 167 is driven by a conventional electric motor 165 here shown in schematic form. In this embodiment, the rotary power supply for the system takes the form of an electric motor.

Figure 9:
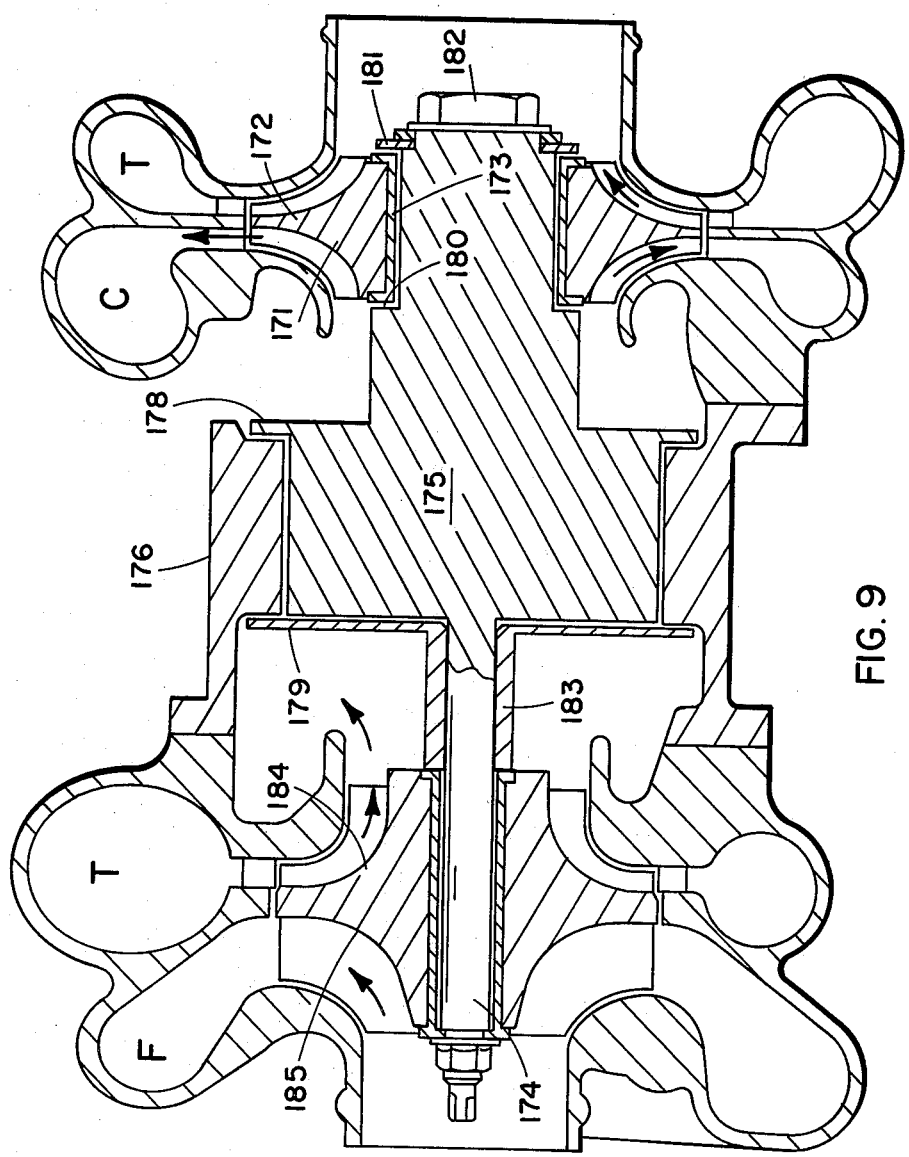
FIG. 9 shows, in partial section, a turbomachine with airbearings suited for use in a system embodying the invention.

Reference is now made to FIG. 9 in which, there is illustrated a turbomachine that operates in the same fashion as the turbomachine of FIGS. 6 and 7. The principal purpose of this illustration is to set forth an airbearing configuration suitable for use in a turbomachine to be employed in the environmental control system embodying the invention. The turbomachine includes a high-speed compressor 171 integral with a power turbine 172 mutually mounted on power shaft 173. The power shaft 173 is mounted on an enlarged end portion (not referenced) of shaft 174. The power shaft 173 cooperates with the shaft 174 to provide a hydrodynamic airbearing. Shaft 174 includes a thrust bearing shoulder 180 as shown. The high-speed compressor/power turbine 171, 172 is held in position by thrust bearing washer 181. Washer 181 is secured to the end of shaft 174 by nut 182.

The shaft 174 has secured thereto for rotation therewith, expansion cooling turbine disk 184 and fan 185. The shaft 174 includes an enlarged central portion 175 that includes a thrust bearing flange 178 which cooperates with the turbomachine housing 176 to provide a hydrodynamic air thrust bearing. A second hydrodynamic air thrust bearing is fashioned by thrust bearing disk 179. The thrust bearing disk 179 is secured to and forms a part of collar 183 shown disposed between expansion cooling turbine disk 184 and the enlarged central portion 175. Each of the aforementioned bearings are airbearings whose operation is enhanced by causing shaft 174 to rotate in a direction opposite to concentric power shaft 173.

From the foregoing description, it is apparent that the invention described provides a novel turbomachine employing a bootstrap compressor/expansion cooling turbine in concentric shaft arrangement, that results in an airconditioning system that is highly efficient and need not depend upon bleed air for powering the system.

Although this invention has been illustrated and described in connection with the particular embodiments illustrated, it will be apparent to those skilled in the art that various changes may be made therein without departing from the spirit of invention as set forth in the appended claims.

I claim:

1. An airconditioning control system for an enclosure, the environment of which is to be controlled, including in combination;
    a rotary power supply,
    a turbomachine including a power compressor for providing compressed air secured to a power shaft, said rotary power supply drivingly coupled to said power shaft to operate at a given speed; an expansion cooling turbine mounted on a shaft concentric to said power shaft,
    means for directing a source of ambient air to and through a heat exchanger,
    said power compressor coupled to said enclosure and through said heat exchanger to an input of the expansion cooling turbine to thereby draw air from said enclosure and deliver said compressed air to said expansion cooling turbine, said expansion cooling turbine operating at a different speed than said given speed of said power shaft, and
    said expansion cooling turbine having an output coupled to said enclosure to deliver conditioned air which has been cooled to said enclosure.

2. The combination of claim 1, wherein said rotary power supply is a pneumatic turbine.

3. The combination of claim 1, wherein said rotary power supply is a hydraulic motor.

4. The combination of claim 1, wherein said rotary power supply is an electric motor.

5. The combination of claim 1, wherein said means for directing a source of ambient air is a power driven fan.

6. The combination of claim 5, wherein said fan is mechanically secured to said expansion cooling turbine.

7. The combination of claim 5, wherein said expansion cooling turbine shaft is concentrically mounted on said power shaft.

8. The combination of claim 7, wherein said turbomachine further includes a compressor integral with said expansion cooling turbine and mounted on said shaft concentric with said power shaft.

9. The combination of claim 8, wherein said power shaft operates at a lower speed than said shaft mounted concentric to said power shaft.

10. The combination of claim 9, wherein said power shaft and said shaft mounted concentric to said power shaft rotate in the same direction.

11. The combination of claim 8, wherein said power driven fan is mechanically coupled to said power shaft.

12. The combination of claim 11, wherein said fan is integrally secured to said power compressor.

13. The combination of claim 5, wherein said power driven fan is mechanically coupled to said power shaft.

14. The combination of claim 1, wherein there is provided an air bearing between said shaft mounted concentric to said power shaft.

15. the combination of claim 14, wherein said shaft mounted concentric to said power shaft and said power shaft rotate in opposite directions.

16. An airconditioning control system for an aircraft cabin, the environment of which is to be controlled, including in combination;
a rotary power supply,
a turbomachine including a power compressor for providing compressed air secured to a power shaft, said rotary power supply drivingly coupled to said power shaft to operate at a given speed; an expansion cooling turbine mounted on a shaft concentric to said power shaft,
means for directing a source of ambient air to and through a heat exchanger,
said power compressor coupled to said cabin and through said heat exchanger to an input of the expansion cooling turbine to thereby draw air from said cabin and deliver said compressed air to said expansion cooling turbine, said expansion cooling turbine operating at a different speed than said given speed of said power shaft, and
said expansion cooling turbine having an output coupled to said enclosure to deliver conditioned air which has been cooled to said cabin,
a source of bleed air and control means therefore, temperature control means,
cabin temperature sensing means controllingly connected to said bleed air control means through said temperature control means,
said integral compressor having an output coupled to said output of said expansion cooling turbine through said bleed air control means whereby bleed air will be allowed to mix with said cooled air dependent upon the cabin temperature sensed by said sensing means.

17. The combination of claim 16, wherein said bleed air is provided by an aircraft engine and said bleed air is of a temperature greater than said ambient air to thereby provide a source of heat to further condition said air for said cabin.

18. The combination of claim 17, which further includes in combination conditioned air temperature sensing means controllingly coupled to said temperature sensing means to thereby cause said bleed air control means to allow the additional entry of heated bleed air whenever said conditioned air temperature reaches a preset level.

19. The combination of claim 18, which further includes a water separator adapted to receive conditioned air and remove water from said conditioned air prior to delivering said conditioned air to said cabin, 20. The combination of claim 19, wherein said removed water is delivered to said heat exchanger and injected into said ambient air directed through said heat exchanger.

21. An airconditioning control system for an enclosure, the environment of which is to be controlled, including in combination;
a rotary power supply,
a turbomachine including a power compressor for providing compressed air secured to a power shaft, said rotary power supply drivingly coupled to said power shaft to operate at a given speed; an integral compressor and an expansion cooling turbine mounted on a shaft concentric to said power shaft,
a power driven fan, said fan directing a source of ambient air to and through a heat exchanger,
said power compressor coupled respectively to said enclosure and an input of said concentrically mounted compressor to thereby draw air from said enclosure and deliver said compressed air to said concentrically mounted compressor,
said concentrically mounted compressor having an output coupled to an input of said expansion turbine through said heat exchanger, said integral compressor and expansion cooling turbine operating at a speed greater than said given speed of said power shaft, and
said expansion cooling turbine having an output coupled to said enclosure to deliver conditioned air which has been cooled to said enclosure.

22. The combination of claim 21, wherein said integral compressor and expansion cooling turbine is of the "bootstrap" type.

23. The combination of claim 22, wherein said shaft on which said integral compressor and expansion cooling turbine are mounted is mounted for rotation on said power shaft.

24. The combination of claim 23, wherein said power driven fan is mechanically coupled to said power shaft.

25. The combination of claim 23, wherein said power shaft and said shaft mounted concentric to said power shaft rotate in the same direction.

26. The combination of claim 23, wherein said power shaft and said shaft mounted on said power shaft rotate in the opposite direction.

27. The combination of claim 26, wherein said turbomachine includes an air bearing means disposed between said power shaft and said shaft mounted on said power shaft.

28. The combination of claim 22, wherein said rotary power supply is a hydraulic motor.

29. The combination of claim 22, wherein said rotary power supply is an electric motor.

30. The combination of claim 23, wherein said airconditioning system is for use in an aircraft and the environment to be controlled is an aircraft cabin, said airconditioning system further including in combination;
a source of bleed air and control means therefore, temperature control means,
cabin temperature sensing means controllingly connected to said bleed air control means through said temperature control means,
said integral compressor having an output coupled to said output of said expansion cooling turbine through said bleed air control means whereby bleed air will be allowed to mix with said cooled air dependant upon the cabin temperature sensed by said sensing means.

31. The combination of claim 30, wherein said bleed air is provided by an aircraft engine and said bleed air is of a temperature greater than said ambient air to thereby provide a source of heat to further condition said air for said cabin.

32. The combination of claim 31, which further includes in combination conditioned air temperature sensing means controllingly coupled to said temperature sensing means to thereby cause said bleed air control means to allow the additional entry of heated bleed air whenever said conditioned air temperature reaches a preset level.

33. The combination of claim 32, which further includes a water separator adapted to receive conditioned air and remove water entrained in the conditioned air prior to delivering said conditioned air to said cabin.

34. The combination of claim 33, wherein said removed water is delivered to said heat exchanger and injected into said ambient air directed through said heat exchanger to thereby enhance heat exchanger cooling capacity.

* * * * *